(12) United States Patent
Kindaichi

(10) Patent No.: US 6,501,910 B2
(45) Date of Patent: Dec. 31, 2002

(54) CAMERA DISTANCE MEASURING DEVICE

(75) Inventor: Takeshi Kindaichi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/837,930

(22) Filed: Apr. 19, 2001

(65) Prior Publication Data
US 2001/0038750 A1 Nov. 8, 2001

(30) Foreign Application Priority Data
May 8, 2000 (JP) ........................................ 2000-135028

(51) Int. Cl.⁷ ............................................... G03B 13/36
(52) U.S. Cl. ......................... 396/96; 396/98; 396/104; 396/109
(58) Field of Search ................................ 396/109, 104, 396/157, 98, 106, 96

(56) References Cited
U.S. PATENT DOCUMENTS
6,308,015 B1 * 10/2001 Matsumoto ................. 396/106

* cited by examiner

Primary Examiner—W. B. Perkey
(74) Attorney, Agent, or Firm—Straub & Pokotylo; John C. Pokotylo

(57) ABSTRACT

The present invention is a camera distance measuring device having an integral light receiving element for receiving light from a photographic object and outputting light received signals, and a fixed light elimination circuit for eliminating the fixed light component from the output signals of this integral light receiving element. This camera distance measuring device functions as an active distance measuring device by making the fixed light elimination circuit operative and functions as a passive distance measuring device by making the fixed light elimination circuit inoperative. When functioning as an active distance measuring device, this camera distance measuring device alternatively employs either a first illumination device such as a strobe light for illuminating a wide range including the photography range or a second illumination device such as an infrared LED for illuminating a spot-like range within the photography range.

14 Claims, 2 Drawing Sheets

CAMERA DISTANCE MEASURING DEVICE

This application claims benefit of Japanese Application No. 2000-135028 filed in Japan on May 8, 2000, the contents of which are incorporated by these references.

BACKGROUND OF THE INVENTION

1. Field of the Invention

The present invention relates to a camera distance measuring device, and particularly to a camera distance measuring device which illuminates a photographic object if required and measures the distance thereto.

2. Related Art Statement

Conventionally, various camera distance measuring devices have been proposed, and known as such distance measuring methods are the trigonometrical survey method and the spectrum time detection method. Among these methods, the trigonometrical survey method is generally employed with cameras, and this trigonometrical survey method can be classified broadly into a passive method and an active method.

A typical distance measuring device employing the aforementioned passive method is structured, for example, of a pair of line sensors which separates light from the photographic object into a pair of light images, and receives and converts such light into electrical signals, respectively. Moreover, when the luminance or contrast of the photographic object is low, the distance measuring device may also comprise an auxiliary light source such as a strobe light for irradiating illumination light toward the photographic object. In this passive method, it is possible to precisely measure the distance even if the photographic object is distant, and it is further possible to measure the distance extensively within the photography range when the photographic object is bright and the contrast of the photographic object is sufficient. In contrast, when the luminance or contrast of the photographic object is low, it becomes difficult to accurately measure the distance when the illumination by the aforementioned auxiliary light source is insufficient.

Moreover, a typical distance measuring device employing the aforementioned active method comprises, for example, an IRED for projecting an infrared light beam toward a photographic object and a PSD for receiving the reflected light from the photographic object to which the aforementioned infrared beam was irradiated. As this active method is basically for projecting infrared light in a beams shape, it is possible to accurately measure the distance to the photographic object even if the object itself has little contrast. In contrast, it is difficult to accurately measure the distance when the photographic object is so distant that the infrared light is not reached, and, in addition, it is only possible to measure the distance to the photographic object positioned near the center of the photography range.

It could be said that the passive method and active method are in a supplemental relationship where the demerit of one method is supplemented by the merit of the other. Thus, in recent years, a high-performance hybrid measuring device has come into practical application by fusing the passive method and active method and supplementing the demerit of one method with the merit of the other.

This hybrid distance measuring device comprises, for example, a pair of line sensors and a projection means, and its basic structure is nearly the same as a basic structure of the passive distance measuring device. Moreover, the hybrid distance measuring device also employs the same phase difference calculating (correlative calculation) as a distance measuring device of the aforementioned passive method upon finding the distance to the photographic object.

The difference between the hybrid method and passive method is that a fixed light elimination circuit is added for each pixel constituting the line sensor. In other words, this hybrid distance measuring device will function as a passive distance measuring device by turning the aforementioned fixed light elimination circuit off, and function as an active distance measuring device by turning the fixed light elimination circuit on.

When turning the fixed light elimination circuit on and making it function as an active distance measuring device, the line sensor receives the light emitted from a projection means such as an infrared LED and reflected from the photographic object. Then, by eliminating the fixed light component with the aforementioned fixed light elimination circuit from the output from the respective pixels of the line sensor, it is possible to abstract the component illuminated by the infrared LED. And, by performing phase difference calculating (correlative calculation) thereto, it is possible to find the distance to the photographic object.

The most important factor which determines the performance of the aforementioned hybrid distance measuring device is, of course, the sensor, but secondly important is the projection means. An ideal projection means comprises a projection element with a large light volume and capable of illuminating light in a wide range.

Nevertheless, the aforementioned ideal projection means, in other words, a projection means with a large light volume and capable of illuminating light in a wide range as well as being miniature so as to be capable of being mounted on a camera, unfortunately, does not exist at present. Therefore, it is necessary to either provide with a projection means separately or to reduce the light volume and mount it on the camera, and it was not possible to maintain the compactness and measure distances with high precision under a broad range of situations.

OBJECT(S) AND SUMMARY OF THE INVENTION

Accordingly, an object of the present invention is to provide a miniature camera distance measuring device capable of measuring distances with high precision under various circumstances.

Simply, the present invention is a camera distance measuring device, which comprises: brightness determination means for determining the brightness of a photographic object; first illumination means for illuminating a range containing at least a photography range of the camera; second illumination means for illuminating a part of the range contained within the photography range of the camera; at least a pair of integral light receiving means having a plurality of pixels and fixed light elimination means corresponding to the respective pixels; integration mode switching means for switching the integration mode of the integral light receiving means by controlling the operative state of the first illumination means, second illumination means and fixed light elimination means; calculating means for finding the distance to the photographic object based on object image signals obtained by the integral light receiving means; and distance measuring inability judgment means for determining whether it is possible to measure the distance by judging the reliability of the output of the calculating means; wherein, when the brightness determination means determines that the photographic object is bright, distance is measured in the first distance measuring mode by the integration mode switching means making the first illumination means, second illumination means and fixed light elimination means inoperative, the integral light receiving means integrating in the second integration mode, and the calculating means finding the distance to the photographic object based on the obtained object image signals; wherein, when the brightness determination means determines that the photographic object is dark, distance is measured in the second distance measuring mode by the integration mode switching means making the second illumination means inoperative and making the first illumination means and fixed light elimination means operative, the integral light receiving means integrating in the second integration mode, and the calculating means finding the distance to the photographic object based on the obtained object image signals; and wherein, when the distance measuring inability judgment means judges the reliability of the distance to the photographic object sought with the calculating means and the result thereof is that distance measuring is impossible, distance is measured in the third distance measuring mode by the integration mode switching means making the first illumination means inoperative and making the second illumination means and fixed light elimination means operative, the integral light receiving means newly integrating in the second integration mode, and the calculating means finding the distance to the photographic object based on the obtained object image signals.

The present invention is also a camera distance measuring device having fixed light elimination means and which functions as an active distance measuring device by making the fixed light elimination means operative and which functions as a passive distance measuring device by making the fixed light elimination means inoperative, comprising: first illumination means for illuminating a range containing at least a photography range when functioning as an active distance measuring device; and second illumination means for illuminating a part of the range contained within the photography range and which becomes operative alternatively with the first illumination means when functioning as an active distance measuring device.

The object(s) and advantages of the present invention will become further apparent from the following detailed explanation.

DETAILED DESCRIPTION OF THE PREFERRED EMBODIMENT(S)

Figure 1:
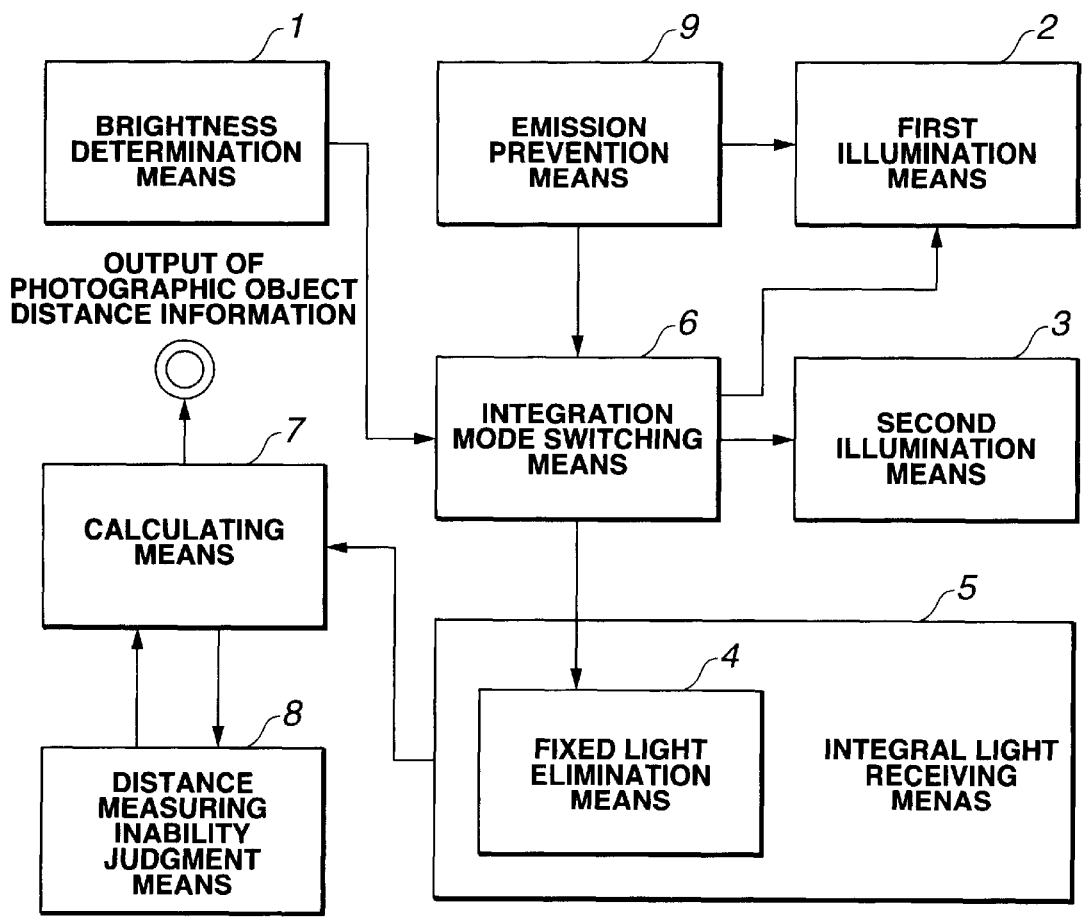
FIG. 1 is a block diagram showing the structure of the camera distance measuring device in one embodiment according to the present invention.

Embodiments of the present invention will be described referring to the drawings.

FIGS. 1 to 3B show one embodiment of the present invention, and FIG. 1 is a block diagram showing the structure of the camera distance measuring device.

This camera distance measuring device, as shown in FIG. 1, comprises an integral light receiving means 5 for receiving and integrating light from the photographic object and outputting object image signals; a fixed light elimination means 4 such as a fixed light elimination circuit, incorporated into the integral light receiving means 5, by being turned on and off switches the integration mode into a second integration mode of an active mode and a first integration mode of a passive mode; a brightness determination means 1 such as a brightness determination circuit for determining the brightness of the photographic object; a first illumination means 2 containing the likes of a first light source which doubles as a means for illuminating the photographic object during camera photography and irradiating auxiliary light during measuring distance; a second illumination means 3 containing the likes of a second light source constituted by a projection means for irradiating a partial narrower range contained in the camera photography range; an emission prohibition means 9 which prohibits the emission of the aforementioned first illumination means 2 by the photographer operation an input means such as a switch and setting the photography mode to the strobe light off mode; an integration mode switching means 6 containing the likes of a light source drive circuit for setting the on/off of the aforementioned first illumination means 2, second illumination means 3 and fixed light elimination means 4 in accordance with the output of the brightness determination means 1 and the output of the emission prohibition means 9; a calculating means 7 such as a calculating circuit for acquiring object image signals from the integral light receiving means 5, and calculating and outputting the photographic distance information; and a distance measuring inability judgment means 8 such as a reliability judgment circuit for calculating and judging the reliability of the photographic distance information calculated by the calculating means 7.

More specifically, for example, the brightness determination means 1 comprises a light receiving element for photometry, a photometry circuit for processing the output of this light receiving element, and a CPU for determining the brightness based on signals output from the photometry circuit. Moreover, instead of the photometry element and photometry circuit, the brightness determination means 1 may the aforementioned integral light receiving means 5 and a CPU such that the CPU monitors the speed of the integration progress and determines the brightness thereby.

Further, for example, the CPU functions as the aforementioned integration mode switching means 6, calculating means 7 and distance measuring inability judgment means 8.

Moreover, the aforementioned integral light receiving means 5 is, for example, an AFIC, and comprises a pair or a plurality of line sensors or area sensors.

Figure 3A:
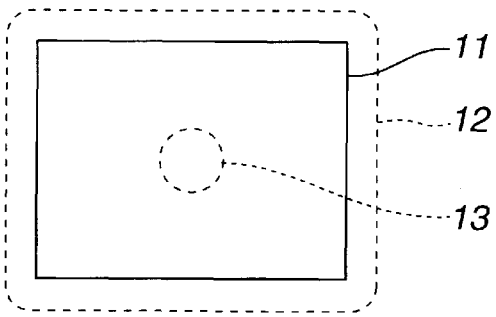
FIG. 3A is a diagram showing the irradiative range to the photographic range.

And, as shown in FIG. 3A, the first illumination means 2 is structured of the likes of a strobe light having a large light volume and capable of irradiating a wide range as shown with reference number 12 containing at least the camera photography range 11.

Figure 3B:
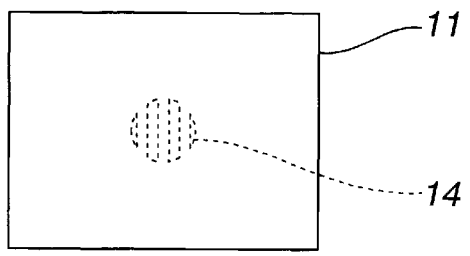
FIG. 3B is a diagram showing an example of the shape of pattern irradiation.

In addition, the second illumination means 3 has, for example, an infrared LED as a light source, for example, and comprises an optical system capable of at least conduct spot irradiation as shown with reference numeral 13 in FIG. 3A or pattern irradiation as shown with reference numeral 14 in FIG. 3B. When employing an optical system capable of pattern irradiation, although there is a disadvantage in that costs will increase for the likes of a filter in comparison to employing an optical system capable of spot irradiation, there is an advantage that it is possible to measure the distance to a photographic object with lower contrast.

Figure 2:
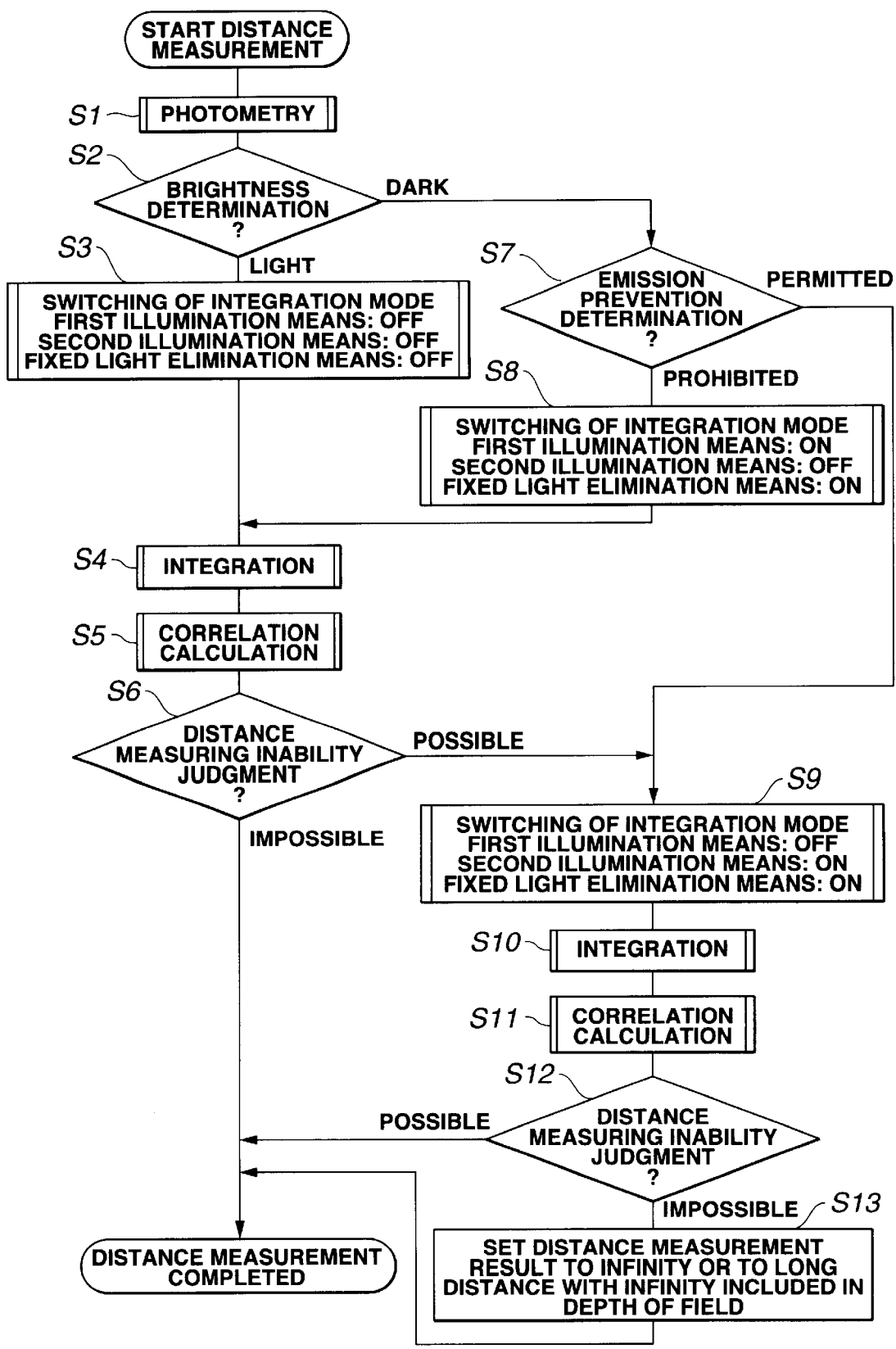
FIG. 2 is a flowchart showing the function of the camera distance measuring device in the aforementioned embodiment.

Next, FIG. 2 is a flowchart showing the function of the camera distance measuring device.

By the photographer operating the likes of a release switch (not shown), distance to the photographic object is measured as a preliminary operation of camera photography upon taking a photograph of the photographic object.

When distance measuring is commenced as above, foremost, the brightness determination means 1 conducts photometry (step S1) by employing a dedicated photometry element or the integral light receiving means 5.

Thereafter, this brightness determination means 1 determines whether the brightness of the photographic object is higher or lower than a predetermined brightness based on the photometry result (step S2). Here, the aforementioned predetermined brightness is previously stored in a non-volatile storage means (not shown) provided in the CPU or in other non-volatile storage means (not shown) provided outside the CPU.

In step S2, when the photographic object is determined as being brighter than the predetermined brightness, the integration mode switching means 6 switches the integration mode and turns all of the first illumination means 2, second illumination means 3 and fixed light elimination means 4 off (step S3). The camera distance measuring device is thereby set to the passive mode without any auxiliary light.

Next, the integral light receiving means 5 generates image signals by performing photographic conversion of the light from the photographic object into electric signals and integrating converted signals (step S4).

The calculating means 7 thereafter executes correlative calculation (step S5). For example, in the case of a multi AF capable of measuring the distance at a plurality of points within the photography range, correlative calculation is executed in relation to the plurality of distance measuring areas and the closest area is selected.

Thereafter, the distance measuring inability judgment means 8 judges the reliability of the result obtained from the aforementioned correlative calculation (step S6). In the case of the multi AF, the reliability of the correlative calculation of the closest distance measuring area selected is judged.

In this step S6, when it is judged that the result is reliable and distance measuring is possible, the distance measuring inability judgment means 8 permits the output of the calculation result from the calculating means 7 as photographic distance information, and then ends this distance measuring processing.

Meanwhile, in the aforementioned step S6, when it is judged that the result is unreliable and distance measuring is impossible, this implies that the photographic object is bright but is difficult to measure the distance in the passive mode; for example, a photographic object without hardly any contrast. Here, the integration mode switching means 6 switches the integration mode; in other words, turns the first illumination means 2 off, turns the second illumination means 3 on, and turns the fixed light elimination means 4 on (step S9). The camera distance measuring device is thereby set to the active mode employing auxiliary light such as infrared LED.

Then, the integral light receiving means 5 generates image signals by performing photographic conversion of the light from the photographic object into electric signals and integrating converted signals (step S10), and the calculating means 7 thereafter executes correlative calculation (step S11). Here, for example, even in the case of a multi AF, distance is measured only at points illuminated by the second illumination means.

Thereafter, the distance measuring inability judgment means 8 judges the reliability of the result obtained from the aforementioned correlative calculation (step S12).

In this step S12, when it is judged that distance measuring is possible, the distance measuring inability judgment means 8 permits the output of the calculation result from the calculating means 7 in aforementioned step S11 as photographic distance information, and then ends this distance measuring processing.

Moreover, in the aforementioned step S12, when it is judged that distance measuring is impossible, the photographic object distance information is set at infinity, or at a long distance containing infinity within the depth of field (step S13), and then ends this distance measuring processing.

When the photographic object is dark, the following operations are performed.

In other words, in aforementioned step S2, when it is judged that the photographic object is darker than a predetermined brightness, it is determined whether the emission prohibition means 9 is prohibiting the emission of the first illumination means 2 (step S7). In other words, the operational mode of the camera is determined to judge whether the strobe light is in the off mode.

In this step S7, when the emission of the first illumination means 2 is not prohibited, the integration mode switching means 6 switches the integration mode; in other words, turns the first illumination means 2 on, turns the second illumination means 3 off, and turns the fixed light elimination means 4 on (step S8). The camera distance measuring device is thereby set to the active mode utilizing auxiliary light such a strobe light.

After step S8 is completed, the routine then proceeds to aforementioned step S4 and performs operations as described above. For example, in the case of a multi AF, illumination reaches a plurality of distance measuring points, and integration and correlative calculation are possible in the respective points.

Furthermore, in step S7, when the emission of the first illumination means 2 is prohibited, the routine proceeds to step S9, and, as described above, carries out distance measuring in the active mode employing auxiliary light such as an infrared LED.

The sensor of the integral light receiving means 5 may be of a type which outputs signals in accordance with the distance to the photographic object, but, needless to say, it may also be the likes of a TTL phase detection sensor for outputting signals corresponding to the state of the lens focus.

According to the embodiments described above, distance measuring with high precision under various situations is possible by selectively employing a first illumination means such as a strobe light having a large light volume and capable of irradiating a wide range, and a second illumination means such as an infrared LED capable of pattern irradiation or spot irradiation though in a narrower range.

In this invention, it is apparent that working modes different in a wide range can be formed on this basis of this invention without departing from the spirit and scope of the invention. This invention is not restricted by any specific embodiment except being limited by the appended claims.

What is claimed is:

1. A camera distance measuring device, comprising:
   brightness determination means for determining brightness of a photographic object;
   first illumination means for illuminating a range containing at least a photography range of the camera;
   second illumination means for illuminating a part of the range contained within said photography range of the camera;
   at least a pair of integral light receiving means having a plurality of pixels and fixed light elimination means corresponding to said respective pixels;
   integration mode switching means for switching an integration mode of said integral light receiving means by controlling an operative state of said first illumination means, said second illumination means and said fixed light elimination means;
   calculating means for finding the distance to the photographic object based on object image signals obtained by said integral light receiving means; and
   distance measuring inability judgment means for determining whether it is possible to measure the distance by judging the reliability of the output of said calculating means;
   wherein, when said brightness determination means determines that the photographic object is bright, distance is measured in a first distance measuring mode by said integration mode switching means making said first illumination means, said second illumination means and said fixed light elimination means inoperative, said integral light receiving means integrating at a first integration mode, and said calculating means finding the distance to the photographic object based on the obtained object image signals;
   wherein, when said brightness determination means determines that the photographic object is dark, distance is measured in a second distance measuring mode by said integration mode switching means making said second illumination means inoperative and making said first illumination means and said fixed light elimination means operative, said integral light receiving means integrating in a second integration mode, and said calculating means finding the distance to the photographic object based on the obtained object image signals; and
   wherein, when said distance measuring inability judgment means judges the reliability of the distance to the photographic object sought with said calculating means and determines that distance measuring is impossible, distance is measured in a third distance measuring mode by said integration mode switching means making said first illumination means inoperative and making said second illumination means and said fixed light elimination means operative, said integral light receiving means newly integrating in the second integration mode, and said calculating means finding the distance to the photographic object based on the obtained object image signals.

2. The camera distance measuring device according to claim 1,
   wherein said first illumination means is a strobe light also serving as an illumination means during photography; and
   said second illumination means is an illumination means employing an infrared LED for performing at least either spot illumination or pattern illumination.

3. A camera distance measuring device, comprising:
   brightness determination means for determining whether the brightness of a photographic object is at a predetermined level of brightness sufficient for measuring the distance in a first distance measuring mode;
   first illumination means for illuminating a range containing at least a photography range of the camera when a second distance measuring mode is set;
   second illumination means for illuminating a part of the range contained within said photography range of the camera when a third distance measuring mode is set;
   at least a pair of integral light receiving means having a plurality of pixels for receiving light from the photographic object and converting same into electrical charge and fixed light elimination means corresponding to said respective pixels to eliminate the fixed light component from the electrical signals output from said pixels;
   calculating means for calculating the distance to the photographic object based on object image signals output from said integral light receiving means;
   distance measuring inability judgment means for determining whether it is possible to measure the distance by judging the reliability of the distance to the photographic object calculated by said calculating means; and
   integration mode switching means which sets said first distance measuring mode and makes said first illumination means, said second illumination means and said integral light receiving means inoperative when said brightness determination means determines that the photographic object is at a predetermined level of brightness; sets said second distance measuring mode and makes said second illumination means inoperative and makes said first illumination means and said integral light receiving means operative when said brightness determination means determines that the photographic object is not at a predetermined level of brightness; and sets said third distance measuring mode and makes said first illumination means inoperative and makes said second illumination means and said integral light receiving means operative when said distance measuring inability judgment means judges that distance measuring is impossible.

4. A camera distance measuring device, comprising:
   integral light receiving means for receiving light from a photographic object and outputting object image signals;
   calculating means for calculating the distance to the photographic object based on object image signals output from said integral light receiving means;
   distance measuring inability judgment means for judging the reliability of the distance to the photographic object calculated by said calculating means;
   first illumination means for illuminating a range containing at least a photography range, and which becomes operative when a second distance measuring mode is set and becomes inoperative when either a first distance measuring mode or a third distance measuring mode is set;
   second illumination means for illuminating a part of the range contained within said photography range, and which becomes operative when said third distance measuring mode is set and becomes inoperative when either said first distance measuring mode or second distance measuring mode is set; and fixed light elimination means for eliminating the fixed light component from the object image signals output from said integral light receiving means and outputting the result to said calculating means, and which becomes operative when either said second distance measuring mode or third distance measuring mode is set and becomes inoperative when said first distance measuring mode is set;

wherein said first distance measuring mode is set when the photographic object is brighter than a predetermined brightness, said second distance measuring mode is set when the photographic object is darker than said predetermined brightness, and said third distance measuring mode is set when the calculated distance to the photographic object is judged as being unreliable by said distance measuring inability judgment means in said first distance measuring mode or when it is not possible to set a mode to the second distance measuring mode.

5. A camera distance measuring device having fixed light elimination means, which functions as an active distance measuring device by making said fixed light elimination means operative and functions as a passive distance measuring device by making said fixed light elimination means inoperative, comprising:

first illumination means for illuminating a range containing at least a photography range when functioning as an active distance measuring device; and second illumination means for illuminating a part of the range contained within said photography range and which becomes operative alternatively with said first illumination means when functioning as an active distance measuring device.

6. A camera having a plurality of light sources for illuminating a photographic object, comprising:

a strobe light for illuminating a wide range;

an LED for illuminating a range narrower than said strobe light;

a sensor for receiving light from the photographic object and outputting signals corresponding to the distance to the photographic object or signals corresponding to the state of lens focus;

a light source drive circuit for controlling the operation of said strobe light and LED when said sensor receives light from said photographic object; and a calculating circuit for calculating the distance to the photographic object or the drive amount of the lens based on the output from said sensor.

7. The camera, according to claim 6, further comprising a brightness determination means for determining whether the brightness of the photographic object is higher than a predetermined value, wherein said light source drive circuit makes said strobe light and LED inoperative when said brightness determination means determines that the brightness of the photographic object is higher than said predetermined value, and otherwise makes either said strobe light or LED operative.

8. The camera according to claim 7, further comprising a switch to be turned off by a photographer for turning the drive of said strobe light off, wherein said light source drive circuit makes only said strobe light operative when the brightness of the photographic object is lower than a predetermined value and said strobe light is not turned off by the operation of said switch, and otherwise makes only said LED operative.

9. The camera according to claim 6, further comprising a reliability judgment circuit for judging the reliability of the calculation results of said calculating circuit, wherein said light source drive circuit makes only said LED operative when said reliability judgment circuit judges that said calculation results are unreliable.

10. A camera distance measuring device having fixed light elimination circuit, which functions as an active distance measuring device by making said fixed light elimination circuit operative and which functions as a passive distance measuring device by making said fixed light elimination circuit inoperative, comprising:

a first light source for illuminating a range containing at least a photography range when functioning as an active distance measuring device; and a second light source for illuminating a part of the range contained within said photography range and which becomes operative alternatively with said first light source when functioning as an active distance measuring device.

11. A camera having a plurality of light sources for illuminating a photographic object, comprising:

a first light source for illuminating a wide range;

a second light source for illuminating a range narrower than said first light source;

a sensor for receiving light from the photographic object and outputting signals corresponding to the distance to the photographic object or signals corresponding to the state of lens focus;

a light source drive circuit for controlling the operation of said first light source and second light source when said sensor receives light from said photographic object; and a calculating circuit for calculating the distance to the photographic object or the drive amount of the lens based on the output from said sensor.

12. The camera, according to claim 11, further comprising a brightness determination means for determining whether the brightness of the photographic object is higher than a predetermined value, wherein said light source drive circuit makes said first light source and second light source inoperative when said brightness determination means determines that the brightness of the photographic object is higher than said predetermined value, and otherwise makes either said first light source or second light source operative.

13. The camera according to claim 12, further comprising a switch to be turned off by a photographer for turning the drive of said first light source off, wherein said light source drive circuit makes only said first light source operative when the brightness of the photographic object is lower than a predetermined value and said first light source is not turned off by the operation of said switch, and otherwise makes only said second light source operative.

14. The camera according to claim 11, further comprising a reliability judgment circuit for judging the reliability of the calculation results of said calculating circuit, wherein said light source drive circuit makes only said second light source operative when said reliability judgment circuit judges that said calculation results are unreliable.

* * * * *